United States Patent [19]
Feagin, Jr. et al.

[11] Patent Number: 5,414,677
[45] Date of Patent: May 9, 1995

[54] GROUND MOVEMENT SENSOR

[76] Inventors: Loyd C., Feagin, Jr. R.R. 2, Box 365, Salters, S.C. 29590; George Spector, 233 Broadway Rm 702, New York, N.Y. 10279

[21] Appl. No.: 194,168
[22] Filed: Feb. 9, 1994
[51] Int. Cl.⁶ ............................................. G01V 1/16
[52] U.S. Cl. .................................. 367/179; 181/122; 33/366; 73/652
[58] Field of Search ................ 367/178, 179; 181/122; 33/366; 73/652; 340/690

[56] References Cited

U.S. PATENT DOCUMENTS

| | | | |
|---|---|---|---|
| 3,962,693 | 6/1976 | Schamblin | 33/353 |
| 4,138,824 | 2/1979 | Ponce de Leon | 33/366 |
| 4,507,603 | 3/1985 | Roach et al. | 33/366 |
| 4,689,997 | 9/1987 | Windisch | 73/652 |
| 4,876,799 | 10/1989 | Wolf | 33/366 |
| 4,947,692 | 8/1990 | Koppel | 73/786 |
| 4,949,467 | 8/1990 | Omah et al. | 33/366 |
| 5,065,522 | 11/1991 | Motoda et al. | 33/394 |

Primary Examiner—J. Woodrow Eldred

[57] ABSTRACT

An earth movement sensor is provided which consists of a housing having a top shelf and an intermediate shelf. An electrically energizing signalling alarm is carried in the housing. An electrical power source is carried in the housing for the alarm. A pendulum operated switch is suspended from the top shelf in the housing and is operatively connected between the power source and the alarm, to energize the alarm from the power source when there is earth movement.

3 Claims, 1 Drawing Sheet

GROUND MOVEMENT SENSOR

BACKGROUND OF THE INVENTION

The instant invention relates generally to seismographs and more specifically it relates to an earth movement sensor, which provides a mechanism that will sound an alarm during an earthquake, explosion and mud slide.

There are available various conventional seismographs which do not provide the novel improvements of the invention herein disclosed.

SUMMARY OF THE INVENTION

A primary object of the present invention is to provide an earth movement sensor that will overcome the shortcomings of the prior art devices.

Another object is to provide an earth movement sensor that will save lives by alerting individuals in homes and work places of an impending disaster, by sounding an alarm in the event of an earthquake, explosion and mud slide.

An additional object is to provide an earth movement sensor that can be used as a backup system, which warns of after shocks when the electrical power has been knocked out.

A further object is to provide an earth movement sensor that is simple and easy to use.

A still further object is to provide an earth movement sensor that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
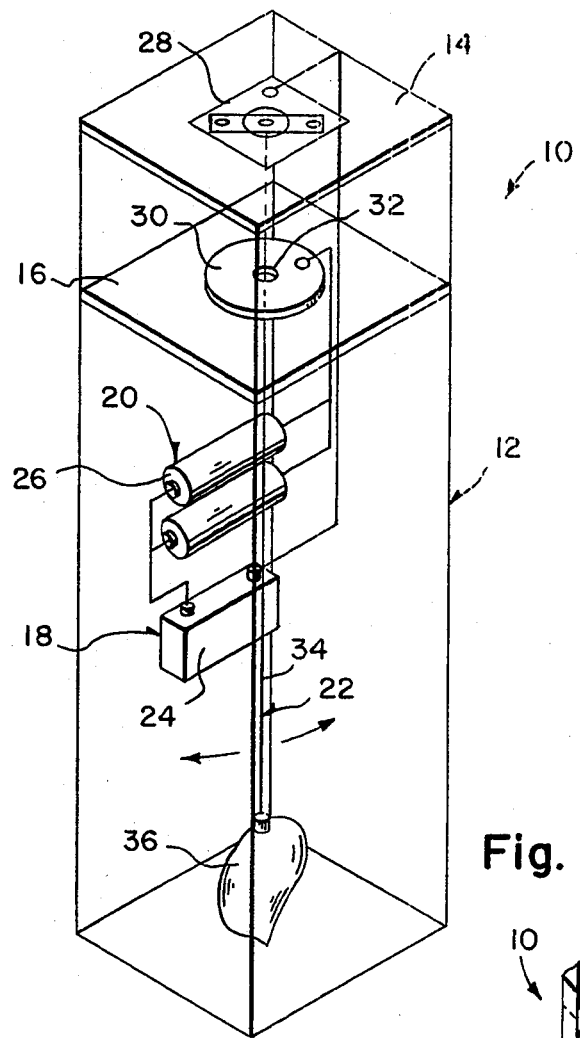
FIG. 1 is a diagrammatic perspective view of the instant invention.

Turning now descriptively to the drawings, in which similar reference characters denote similar elements throughout the several views, FIG. 1 illustrates an earth movement sensor 10, which consists of a housing 12 having a top shelf 14 and an intermediate shelf 16. An electrically energizing signalling alarm 18 is carried in the housing 12. An electrical power source 20 is carried in the housing for the alarm 18. A pendulum operated switch 22 is suspended from the top shelf 14 in the housing 12 and is operatively connected between the power source 20 and the alarm 18, to energize the alarm 18 from the power source 20 when there is earth movement.

The alarm 18 is a buzzer 24 that serves to warn of danger by emitting a sound. The power source 20 is a battery pack 26.

The pendulum operated switch 22 includes a positive metal plate 28 mounted to the top shelf 14 of the housing 12. The metal plate 28 is electrically connected to the buzzer 24. A negative contact washer 30 having an orifice 32 is mounted on the intermediate shelf 16 of the housing 12 and is electrically connected to the battery pack 26. A steel wire 34 is suspended from the metal plate 28 and extends through the orifice 32 of the contact washer 30. A weight 36 is affixed to a lower end of the steel wire 34. When the weight 36 swings, the steel wire 34 will engage with the contact washer 30, to close a circuit to activate the buzzer 24.

Figure 2:
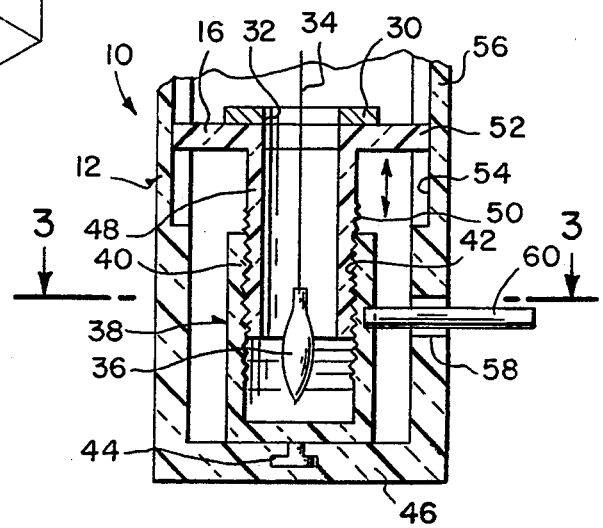
FIG. 2 is an elevational cross sectional view of a lower portion of a modification in which a structure is provided for raising and lowering the intermediate shelf of the housing, to adjust the sensitivity of the contact made between the movement of steel wire within the orifice in the contact washer.
Figure 3:
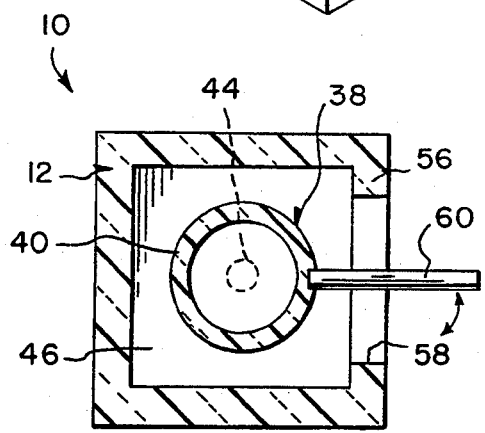
FIG. 3 is a cross sectional view taken along line 3—3 in FIG. 2, showing the bottom sleeve with a handle in greater detail.

As shown in FIGS. 2 and 3, a structure 38 is provided for raising and lowering the intermediate shelf 16 of the housing 12, to adjust the sensitivity of the contact made between the movement of the steel wire 34 within the orifice 32 in the contact washer 30.

The raising and lowering structure 38 contains a first sleeve 40, having internal threads 42 and is swivel mounted at 44 to a bottom portion 46 of the housing 12. A second sleeve 48 having external threads 50 extend downwardly from the intermediate shelf 16 to engage within the first sleeve 40. At least one tongue 52 and groove 54 is between the intermediate shelf 16 and a vertical portion 56 of the housing 12. The housing 12 has a horizontal slot 58 through one vertical portion 56. A handle 60 is affixed at one end to the first sleeve 40 and extends through the horizontal slot 58. A person can manually turn the first sleeve 40 to cause the intermediate shelf 16 to ride up and down within the housing 12.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. An earth movement sensor which comprises:
    a) a housing having a top shelf and an intermediate shelf;
    b) an electrically energizing signalling alarm carried in said housing;
    c) an electrical power source carried in said housing for said alarm;
    d) a pendulum operated switch suspended from the top shelf in said housing and operatively connected between said power source and said alarm to energize said alarm from said power source when there is earth movement; wherein said alarm is a buzzer that serves to warn of danger by emitting a sound; wherein said power source is a battery pack, wherein said pendulum operated switch includes:
    e) a positive metal plate mounted to the top shelf of said housing, said metal plate electrically connected to said alarm;
    f) a negative contact washer having an orifice mounted on the intermediate shelf of said housing and electrically connected to said power source;
    g) a steel wire suspended from said metal plate and extending through the orifice of said contact washer and h) a weight affixed to a lower end of said steel wire, so that when said weight swings, said steel wire will engage with said contact washer to close a circuit to activate said alarm; further including means for raising and lowering the intermediate shelf of said housing, to adjust the sensitivity of the contact made between the movement of said steel wire within the orifice in said contact washer.

2. An earth movement sensor as recited in claim 1, wherein said raising and lowering means includes:
a) a first sleeve having internal threads swivel mounted to a bottom portion of said housing;
b) a second sleeve having external threads extending downwardly from the intermediate shelf to engage within said first sleeve;
c) at least one tongue and groove between the intermediate shelf and a vertical portion of said housing;
d) said housing having a horizontal slot through one vertical portion and
e) a handle affixed at one end to said first sleeve and extending through said horizontal slot, so that a person can manually turn said first sleeve to cause the intermediate shelf to ride up and down within said housing.

3. An earth movement sensor which comprises:
a) a housing having a top shelf and an intermediate shelf;
b) an electrically energizing signalling alarm carried in said housing;
c) an electrical power source carried in said housing for said alarm;
d) a pendulum operated switch suspended from the top shelf in said housing and operatively connected between said power source and said alarm to energize said alarm from said power source when there is earth movement; wherein said pendulum operated switch includes:
e) a positive metal plate mounted to the top shelf of said housing, said metal plate electrically connected to said alarm;
f) a negative contact washer having an orifice mounted on the intermediate shelf of said housing and electrically connected to said power source;
g) a steel wire suspended from said metal plate and extending through the orifice of said contact washer and
h) a weight affixed to a lower end of said steel wire, so that when said weight swings, said steel wire will engage with said contact washer to close a circuit to activate said alarm; further including means for raising and lowering the intermediate shelf of said housing, to adjust the sensitivity of the contact made between the movement of said steel wire within the orifice in said contact washer.

* * * * *